United States Patent
Takagi

(10) Patent No.: US 8,789,848 B2
(45) Date of Patent: Jul. 29, 2014

(54) AIRBAG DEVICE

(71) Applicant: Nihon Plast Co., Ltd., Fujinomiya (JP)

(72) Inventor: Mamoru Takagi, Fujinomiya (JP)

(73) Assignee: Nihon Plast Co., Ltd., Shizuoka (JP)

( * ) Notice: Subject to any disclaimer, the term of this patent is extended or adjusted under 35 U.S.C. 154(b) by 0 days.

(21) Appl. No.: 13/904,149

(22) Filed: May 29, 2013

(65) Prior Publication Data

US 2013/0320655 A1     Dec. 5, 2013

(30) Foreign Application Priority Data

May 29, 2012   (JP) .................................. 2012-122192

(51) Int. Cl.
*B60R 21/16*    (2006.01)
*B60R 21/20*    (2011.01)

(52) U.S. Cl.
USPC ...................... 280/743.1; 280/728.2; 280/731

(58) Field of Classification Search
USPC ..................................... 280/731, 743.1, 728.2
See application file for complete search history.

(56) References Cited

U.S. PATENT DOCUMENTS

| | | | | |
|---|---|---|---|---|
| 5,573,270 | A * | 11/1996 | Sogi et al. ...................... | 280/740 |
| 6,099,026 | A * | 8/2000 | Ando et al. .................. | 280/728.3 |
| 6,206,409 | B1 * | 3/2001 | Kato et al. ................... | 280/728.2 |
| 6,612,609 | B1 * | 9/2003 | Rodriguez et al. ............ | 280/729 |
| 6,682,093 | B2 * | 1/2004 | Tajima et al. .................. | 280/732 |
| 6,722,695 | B2 * | 4/2004 | Kobayashi et al. ........... | 280/739 |
| 7,328,911 | B2 * | 2/2008 | Chapman .................... | 280/728.2 |
| 7,401,811 | B2 * | 7/2008 | Nagai et al. ................. | 280/743.1 |
| 7,445,239 | B2 * | 11/2008 | Okada et al. ............... | 280/743.1 |
| 7,568,730 | B2 * | 8/2009 | Kwon ......................... | 280/743.2 |
| 7,845,683 | B2 * | 12/2010 | Sato et al. ................... | 280/743.2 |
| 2012/0018986 | A1 * | 1/2012 | Feller ......................... | 280/728.3 |

FOREIGN PATENT DOCUMENTS

JP      2006-27374 A      2/2006

* cited by examiner

*Primary Examiner* — Ruth Ilan
*Assistant Examiner* — Darlene P Condra
(74) *Attorney, Agent, or Firm* — Marvin A. Motsenbocker; MOTS Law, PLLC

(57) ABSTRACT

An airbag device includes an airbag folded into a shape having a base portion, an upper surface opposite the base portion, and a side portion surrounding a portion between the base portion and the upper surface, and a holding member configured to cover the airbag as folded by being laid over the airbag as folded. The holding member has a plurality of cloth piece portions and a single connection portion connecting the plurality of cloth piece portions to one another. The connection portion of the holding member is located at the upper surface of the airbag as folded.

3 Claims, 6 Drawing Sheets

AIRBAG DEVICE

CROSS REFERENCE TO RELATED APPLICATION

This application is based upon and claims the benefit of priority from the prior Japanese Patent Application No. 2012-422192, filed on May 29, 2012, the entire contents of which are incorporated herein by reference.

BACKGROUND

1. Technical Field

The present invention relates to an airbag device, and relates particularly to an airbag device having a holding member configured to maintain a folded shape of a folded airbag.

2. Related Art

Airbags are in widespread use as means for improving the safety of an occupant and the like in a travelling vehicle. An airbag is installed at a driver's seat, a front passenger's seat, a seatback, and/or a roof side rail of an automobile to buffer the impact received by the head, chest, waist, or knees of an occupant coming into contact with an interior component upon a frontal collision or a lateral collision. Moreover, in recent years, an airbag installed at a front cowl portion for protection of pedestrians is under development for practical use.

An airbag is installed in a vehicle while normally being folded, and in often cases, they are never used throughout the life of the vehicle. An unused airbag constantly occupies an airbag installation space in a vehicle until a possible event when it is needed. An attempt for space saving and size reduction of an airbag device has been made so as to enable a layout having a good balance between an appropriate place inside an instrumental panel containing display devices for, for example, an engine, a motor, and the like which are functions used regularly and a place near an occupant which is preferable in view of improvement in convenience. Above all, an airbag device for a driver's seat is often installed in a center pad of a steering wheel, and the center pad is preferably compact in consideration of ease of viewing a speed meter and the like and in consideration of steerability. A compact center pad also enables a sporty design.

An airbag for the driver's seat is therefore folded compactly and placed in the center of the steering wheel while being covered by an airbag cover. A method for holding such a folded airbag with a holding member is used so that the folded airbag can be easily treated with a certain work in an assembling process and can be provided with stable quality.

Japanese Patent Application Publication No. 2006-27374 proposes an airbag device including the following airbag and airbag wrapper. Specifically, the airbag has a bag shape and includes an inlet opening through which an inflation gas enters the inside of the airbag. The airbag is folded as follows. A straight line passing through the center of the inlet opening along an opening plane of the upper side of the inlet opening is used as an arrangement reference line. Both ends of a folded body immediately before being completely folded, which extend to the respective sides from the arrangement reference line, are brought closer to the arrangement reference line and brought into face-to-face with each other at the arrangement reference line. The airbag is thus folded axisymmetrically into a complete folded body of a substantially cuboid shape, and is housed in this state. The airbag wrapper is formed of a flexible sheet material. The airbag wrapper is placed to surround the complete folded body so that the complete folded body can be prevented from being bent and losing shape. The airbag wrapper can also be broken upon inflation of the airbag.

The airbag wrapper includes: a covering portion having a to-be-broken portion located in a region above the arrangement reference line and configured to press the upper surface of the complete folded body; and fixing portions extending from the covering portion to both sides in a direction orthogonal to the arrangement reference line and configured to be fixed to the complete folded body.

The to-be-broken portion includes: multiple breaking openings penetrating from the front to the rear surfaces of the covering portion and capable of separating both edges of the covering portion extending in a direction of the arrangement reference line from each other upon inflation of the airbag; and joint portions configured to be opened upon breaking of the covering portion in such a manner as to connect the adjacent breaking openings.

The breaking openings each extend across the arrangement reference line to both sides of the arrangement reference line. The joint portions which are respectively located at one end and the other end of each breaking opening and thus adjacent to each other are located on opposite sides of the arrangement reference line.

At each of both edges of the covering portion in the direction of the arrangement reference line, an edge joint portion capable of being broken upon inflation of the airbag is interposed between the edge and the breaking opening located nearby, and a notch portion is provided. The two notch portions at the respective edges of the covering portion are arranged to be substantially symmetrical with respect to a point corresponding to the center of the inlet opening of the airbag on the arrangement reference line.

SUMMARY

In the above technique, the holding member is employed to cover the folded airbag to hold the folded state of the airbag. The slit-shaped breaking openings are provided to the holding member across the arrangement reference line in a zigzag manner, and are connected to each other by the narrow joint portions so as not to break in a normal situation. The folded airbag is covered with such a holding member. The above patent document states that, even when the arrangement reference line formed by folded lumps of the folded airbag is more or less shifted from a preset position, the airbag device can handle such a situation by having the breaking openings provided across the arrangement reference line.

However, a bias in the deployment force applied to the joint portions is hard to correct. When breaking timings of the multiple joint portions are different from each other, the deployment performance of the airbag is naturally affected by that. Specifically, if one of the multiple joint portions breaks earlier than the others, the airbag can deploy from that joint portion relatively easily, but the other joint portions that break sequentially after the first one might affect the deployment of the airbag.

The difference in the breaking timings of the multiple joint portions might be reduced by making the joint portions as narrow as possible. In this case, however, the very narrow joint portions are scattered at positions away from the center portion of the holding member. Then, it is hard for the joint portions to equally receive a pulling force generated for attachment of the holding member to the airbag, and the joint portion receiving a larger pulling force than the other joint portions might break easily during the attachment process.

Moreover, a certain specific portion does not necessarily break, and more careful management is required. Thus, not only the shape-holding performance, but also attachment workability is degraded drastically.

The present invention aims to provide an airbag device having favorable performance in holding the shape of a folded airbag, favorable workability in attachment of the airbag to a holding member, and favorable breakability of the holding member upon deployment of the airbag.

An airbag device in accordance with some embodiments includes an airbag folded into a shape having a base portion, an upper surface opposite the base portion, and a side portion surrounding a portion between the base portion and the upper surface, and a holding member configured to cover the airbag as folded by being laid over the airbag as folded. The holding member has a plurality of cloth piece portions and a single connection portion connecting the plurality of cloth piece portions to one another. The connection portion of the holding member is located at the upper surface of the airbag as folded.

The plurality of cloth piece portions may equally extend radially from the connection portion.

The plurality of cloth piece portions may be formed by forming slits in a cloth.

The holding member may be provided in a plurality.

According to the above configurations, the airbag device can have favorable performance in holding the shape of its folded airbag, favorable workability in attachment of the airbag to the holding member, and favorable breakability of the holding member upon deployment of the airbag.

DETAILED DESCRIPTION

Embodiments of the invention of the present application are specifically described below with reference to the drawings.

An airbag device according to a first embodiment of the present invention is described with reference to FIGS. 1 to 4E.

There have conventionally been many means for folding an airbag housed in an airbag device. An airbag used in this embodiment is folded by an existing folding apparatus.

As shown in FIGS. 1 to 4E, the airbag device according to this embodiment is to be installed inside a center pad of a steering wheel as an airbag for the driver's seat. An airbag used in this airbag device is a bag body 1 having a pair of substantially-circular base cloths made of synthetic fiber called nylon 66, and the bag body 1 is formed by joining together periphery portions of the base cloths with jointing means such as sewing. Note that the airbag before being folded is called the bag body 1 whereas the airbag after being folded is called a folded airbag 6 to be described later.

Figure 4A:
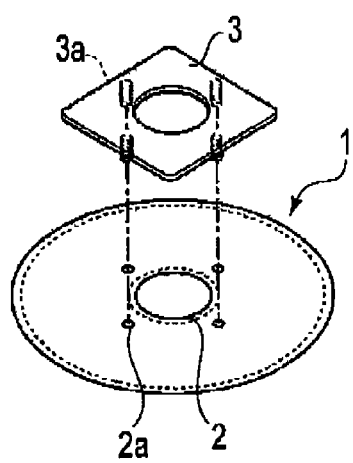
FIGS. 4A to 4E are schematic perspective views showing components of the airbag device according to the first embodiment in an exploded manner and illustrate how the components are assembled.

As shown in FIG. 4A, one of the paired base cloths of the bag body 1 has, at its center portion, a circular gas introduction opening 2 having a size enough to insert therethrough an inflator 10 which is a gas generating device. Additionally, this one of base cloths is provided with four small-diameter openings 2a around the gas introduction opening 2.

Before the bag body 1 is folded, air inside the bag body 1 is drained so that the paired base cloths may be flat, superimposing on each other. As shown in FIG. 4A, a fitting 3 called a retainer is attached to the bag body 1 in advance in the following way. Specifically, the fitting 3, which has four bolts 3a protruding therefrom at its corner portions, is placed inside the bag body 1 from the gas introduction opening 2. Then, the bolts 3a of the fitting 3 are inserted through the openings 2a of the bag body 1 so that the bolts 3a may protrude outward from the bag body 1 through the openings 2a.

Figure 1:
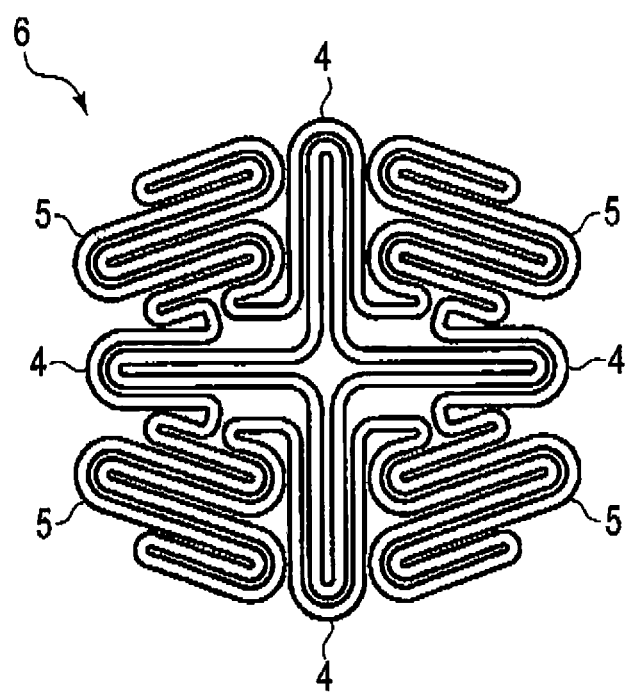
FIG. 1 is a plan view showing the folded shape of an airbag of an airbag device according to a first embodiment of the present invention.
Figure 4B:
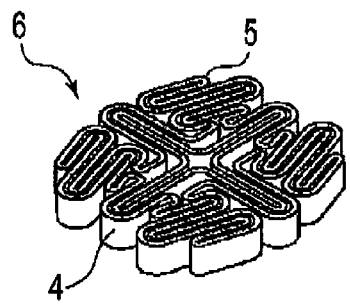

The bag body 1 is subjected to a folding process by a folding apparatus and is thereby formed into the folded airbag 6, shown in FIG. 1 and FIG. 4B, having a base portion with the gas introduction opening 2, an upper surface opposite to the base portion, and a side portion surrounding a portion between the base portion and the upper surface. The folded airbag 6 has the following fold portions: four protruding portions 4 into which gas is speedily introduced and which form substantially a crossed shape, and wavy portions 5 each formed between adjacent ones of the protruding portions 4 and compressed in such a manner as to push out the protruding portions 4. The wavy portions 5 do not overlap the protruding portions 4.

Figure 3:
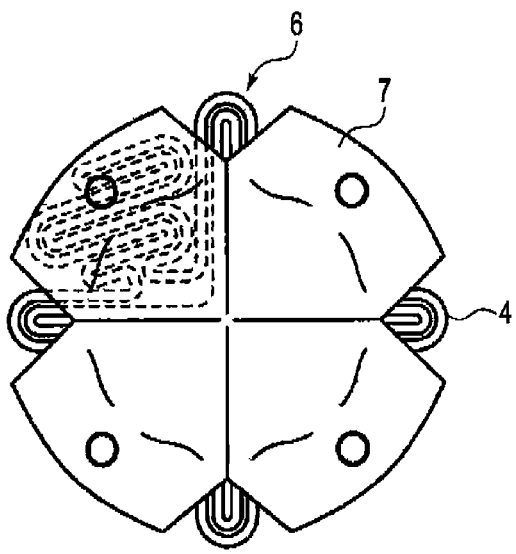
FIG. 3 is a plan view showing the airbag of the airbag device according to the first embodiment, the airbag being covered with and held by a cover cloth.
Figure 4C:
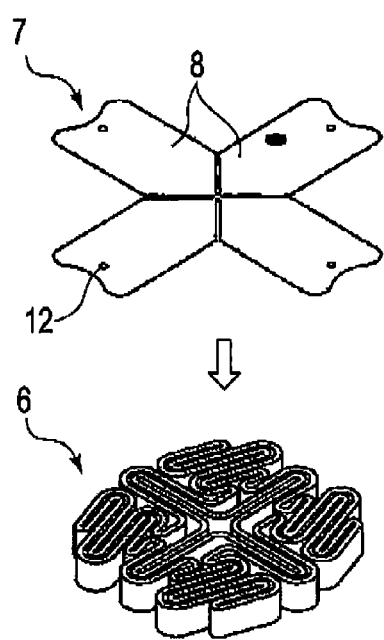
Figure 4D:
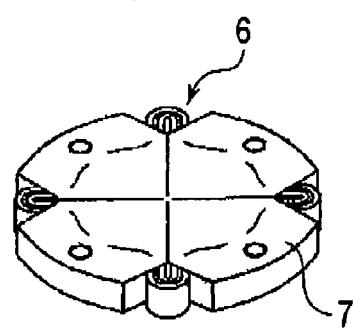

As shown in FIGS. 3, 4C, and 4D, the folded airbag 6 is covered with a cover cloth 7, which is a holding member, in order to be prevented from losing its folded shape. The wavy portions 5 of the folded airbag 6 are folded in a wavelike manner from the outer side of the bag body 1 to the inner side of the bag body 1, and therefore lose shape radially more easily than the protruding portions 4 which do not lose shape easily. For this reason, in this embodiment, the cover cloth 7 is cut into a substantial cross shape so as to cover the wavy portions 5 which easily lose shape radially.

Figure 2:
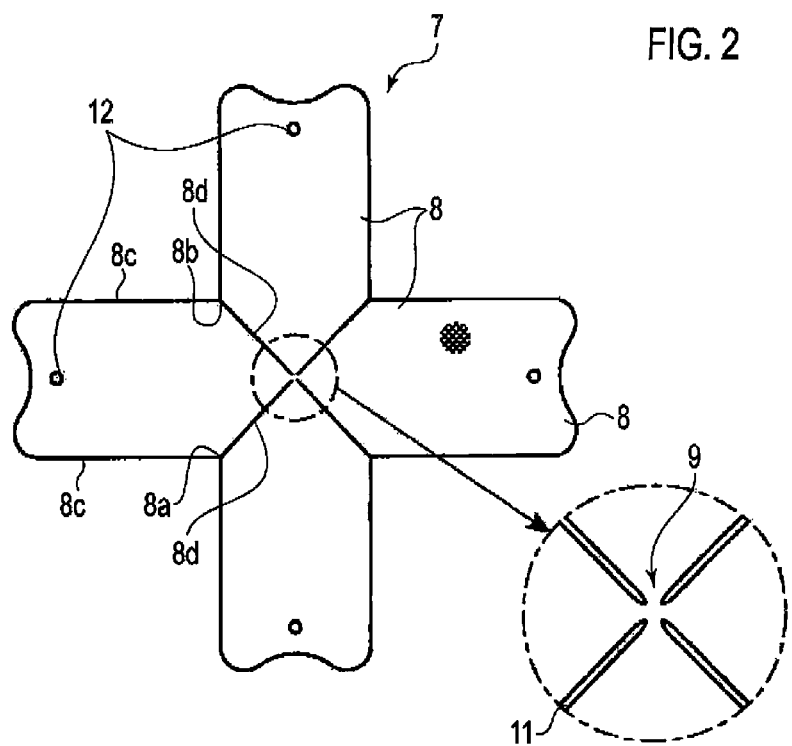
FIG. 2 is a plan view of a cover cloth configured to hold the airbag according to the first embodiment of the present invention.

The cover cloth 7 is formed of a base cloth made of synthetic fiber called nylon 66, as the bag body 1 (or the folded airbag 6) is. As shown in FIG. 2, the cover cloth 7 has four cover-cloth piece portions (cloth piece portions) 8 of substantially the same shape which is almost like an arrow. Each cover-cloth piece portion 8 has paired parallel edge portions 8c and 8c, which respectively has an end portion 8a and an end portion 8b, and diagonal edge portions 8d and 8d extending in the same direction from the respective end portions 8a and 8b obliquely toward the opposite side portions 8c so as to intersect each other.

The four cover-cloth piece portions 8 are connected to one another in such a manner that an intersection of the diagonal edge portions 8d and 8d intersecting away from the pair of edge portions 8c and 8c is connected to the intersections of the other pairs of the diagonal edge portions 8d and 8d at a connection portion 9. Note that, for example, the material, the shape, or the number of the cover-cloth piece portions 8 can be changed according to how the folded shape of the folded airbag 6.

These multiple cover-cloth piece portions 8 extend radially and equally from the single common connection portion 9 and form a substantial cross shape. In other words, the multiple cover-cloth piece portions 8 having substantially the same shape are arranged radially with the connection portion 9 at the center.

Further, as shown in FIG. 2, the cover cloth 7 may have slits 11 or cutouts in such a manner that the multiple cover-cloth piece portions 8 are connected to one another at the single connection portion 9.

At the connection portion 9, a distance between a tip end of the slit 11 formed by the adjacent cover-cloth piece portions 8 and a tip end of the adjacent slit 11 is set to for example 5 mm, but the distance is not limited to this and can be selected from various values, as long as the connection portion 9 does not break while it is attached to the folded airbag 6 and can break when receiving an deployment force of the folded airbag 6.

The cover cloth 7 is attached to the folded airbag 6 by placing the bolts 3a protruding from the periphery portion of the gas introduction opening 2 of the folded airbag 6 into locking hole portions 12 provided to the respective cover-cloth piece portions 8.

Since the cover-cloth piece portions 8 extend equally from the connection portion 9, the cover cloth 7 has a good structural balance. For this reason, even if the power of a worker attaching the cover cloth 7 to the folded airbag 6 is somewhat out of balance, equal power tends to be applied to the cover cloth 7. Thus, the connection portion 9 does not break, enabling favorable workability in attaching the cover cloth 7.

The connection portion 9 of the cover cloth 7 attached to the folded airbag 6 is located near a substantial center portion of the upper surface of the folded airbag 6. The substantial center portion of the folded airbag 6 is approximately the same as a gravity center position of the folded airbag body 1 viewed from the above. In this embodiment, the substantial center portion is located at the same position as a position of the bag body 1 used as a reference when the folding apparatus folds the bag body 1 many times toward the center of the bag body 1 to form the folded shapes of the wavy portions 5 and the protruding portions 4.

Since the connection portion 9 is located near the substantial center portion of the upper surface of the folded airbag 6, when the cover-cloth piece portions 8 are pulled by an inflation pressure applied when the folded airbag 6 is deployed, pulling forces are equally applied to the connection portion 9 from multiple directions, and a predetermined breaking timing can be obtained easily and stably.

Figure 4E:
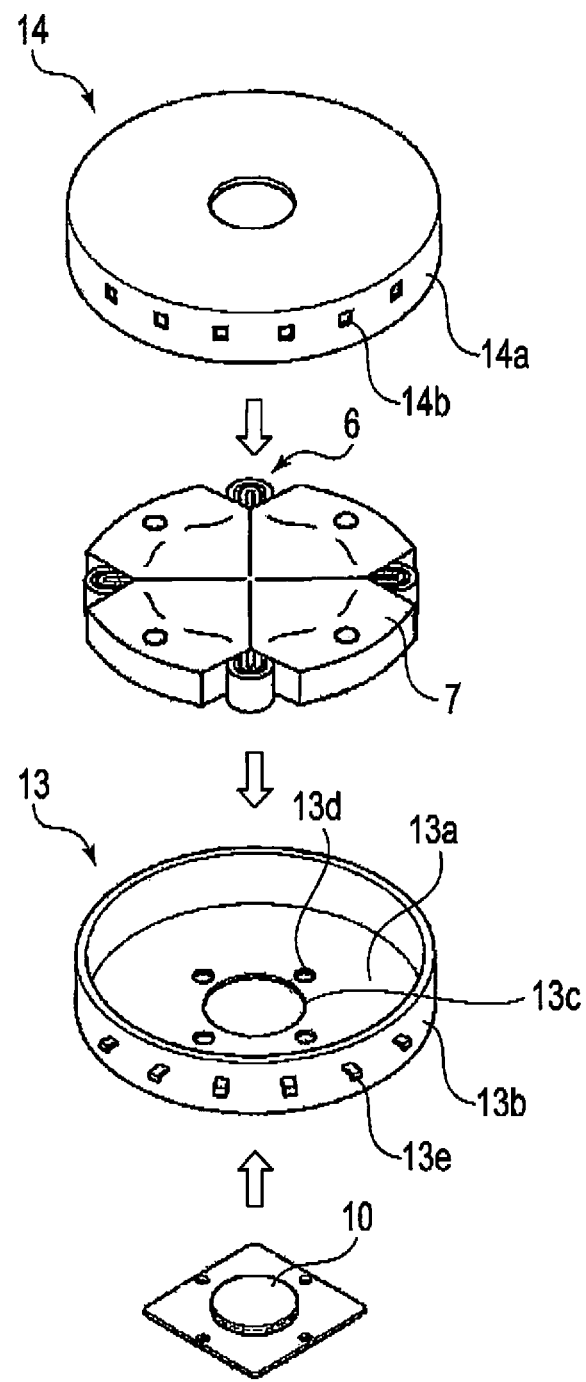

Then, as shown in FIG. 4E, the folded airbag 6 covered with the cover cloth 7 is housed in a base plate 13 which is a box-shaped container made of PP, ABS, or the like which is a relatively hard resin. The base plate 13 includes a bottom portion 13a and an upright wall 13b uprightly extending from the bottom portion 13a and having locking claws 13e projecting therefrom. An upper portion of the base plate 13 is open (i.e., the base plate 13 has an opening portion). The bottom portion 13a has an inflator insertion opening 13c having the same size as the gas introduction opening 2 of the folded airbag 6 and small-diameter openings 13d. The inflator 10 can be inserted into the inflator insertion opening 13c, and the bolts 3a of the fitting 3 protruding from the folded airbag 6 can be inserted into the openings 13d.

As shown in FIG. 4E, after the folded airbag 6 covered with the cover cloth 7 is housed in the base plate 13, a cover body 14 is attached to the base plate 13 from the opening portion side of the base plate 13. The cover body 14 has a box shape and is made of a relatively hard resin such as TPE. The cover body 14 includes a wall portion 14a extending downward from its front surface portion and provided with locking openings 14b. The cover body 14 is attached to the base plate 13 by causing the locking claws 13e of the base plate 13 to engage with the locking openings 14b of the cover body 14.

In this event, the upright wall 13b of the base plate 13 and the wall portion 14a of the cover body 14 slide on each other, but since the folded airbag 6 folded into a complicated shape is covered with the cover cloth 7, the folded airbag 6 does not partly enter a space between the upright wall 13b and the wall portion 14a. This can improve workability and thereby reduce man-hours for management, and also can minimize an afterward adjustment and a decrease in yield, which would be inevitable upon the partial entrance of the folded airbag 6.

After the cover body 14 is attached to the base plate 13, the inflator 10 is fixed to a rear side of the base plate 13 with the bolts 3a. A center pad is thus formed. The center pad is then attached to the steering wheel. Attachment of the airbag device according to this embodiment to a vehicle body is thus completed.

When the airbag device according to this embodiment attached to the vehicle body is activated, the folded airbag 6 is inflated by introduction of gas, and thereby the cover cloth 7 breaks to break and open the cover body 14. The folded airbag 6 is then deployed toward an occupant. The airbag device according to this embodiment offers an excellent effect in such an event, too.

In the airbag device according to this embodiment, the cover-cloth piece portions 8 of the cover cloth 7 covering the folded airbag 6 are connected to one another only with the single connection portion 9. Hence, the airbag device according to this embodiment has much better breakability than a conventional airbag device having multiple connection portions at a breaking portion provided to a cover cloth, and therefore allows the folded airbag 6 to be deployed stably at a desired timing.

Further, the connection portion 9 is provided at the substantial center portion of the cover cloth 7, and the cover cloth 7 has such a structure that the cover-cloth piece portions 8 cover the wavy portions 5 of the folded airbag 6 but not the protruding portions 4 thereof to which gas tends to flow speedily. Thus, in the folded airbag 6 of the airbag device according to this embodiment, a larger amount of gas first flows in a lateral direction where the protruding portions 4 are formed than in an up direction where the connection portion 9 is formed.

Then, when the protruding portions 4 start deploying in the lateral direction, i.e., a radial direction of the folded airbag 6 in a state where it is spread flat, the undeployed wavy portions 5 arranged closely next to the protruding portions 4 move radially, as well. In this event, gas easily flows to the wavy portions 5 since the radial movement of the wavy portions 5 is in the same direction as an unfolding direction of the wavy portions 5 folded in a wavelike manner.

When the radial inflation and deployment of the folded airbag 6 is promoted, radial tension is generated, so that the inflation and deployment of the folded airbag 6 which is not acting in the up direction but in the radial direction pull the cover-cloth piece portions 8 to break the connection portion 9. Thus, the airbag device according to this embodiment is excellent in its deployment performance.

Figure 5:
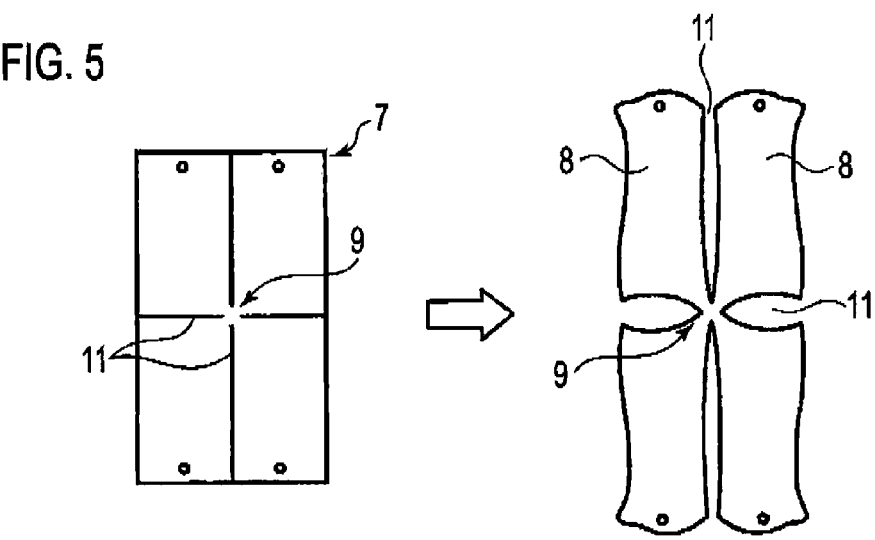
FIG. 5 is a plan view showing a cover cloth, configured to cover the airbag, of an airbag device according to a second embodiment of the present invention.

The embodiment of the present invention is described above, but the present invention is not limited to it. For example, in a second embodiment shown in FIG. 5, the cover cloth 7 may be a single rectangular cloth having slits 11 or cutouts to have a single connection portion 9 at the substantial center portion of the cover cloth 7 and include multiple cover-cloth piece portions 8. In this case, if a substantially rectangular cloth is used, the rectangular cloth may have paired equal-length slits 11 extending from substantial center portions of opposite long edges of the rectangular cloth and paired equal-length slits 11 extending from substantial center portions of opposite short edges of the rectangular cloth. Tip ends of the slits 11 from the long edges and tip ends of the slits 11 from the short edges are close to each other to form the connection portion 9 by which the multiple cover-cloth piece portions 8 are not separated from one another and from which they extend radially and equally. A way to attach the cover cloth 7 to the folded airbag 6, for example, is not different from what is described in the above embodiment, and is therefore not described in detail here. Such a mode can be selected in consideration of a yield and the like. This embodiment can also offer the same effects as the first embodiment.

Figure 6:
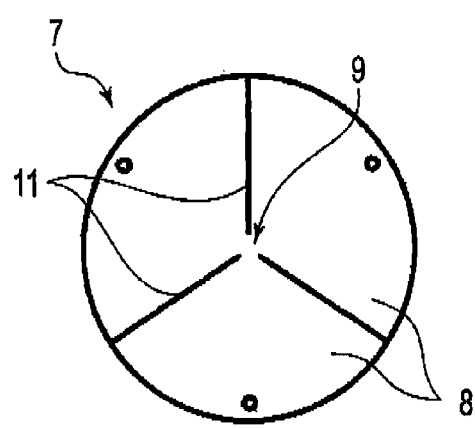
FIG. 6 is a plan view showing a cover cloth, configured to cover the airbag, of an airbag device according to a third embodiment of the present invention.

In a third embodiment shown in FIG. 6, the cover cloth 7 may be a single circular cloth having slits 11 or cutouts to have a single connection portion 9 at the substantial center portion of the cover cloth 7 and include multiple cover-cloth piece portions 8. Also in this case, a way to attach the cover cloth 7 to the folded airbag 6, for example, is not different from what is described in the above embodiment, and is therefore not described in detail here. Such a mode can be selected in consideration of a yield and the like. This embodiment can also offer the same effects as the first embodiment.

Figure 7:
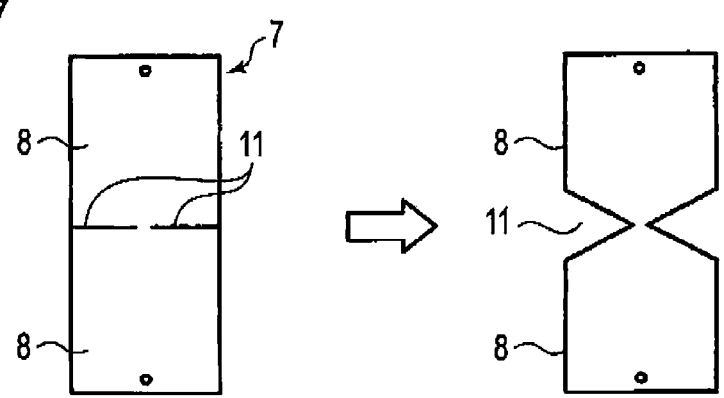
FIG. 7 is a plan view showing a cover cloth, configured to cover the airbag, of an airbag device according to a fourth embodiment of the present invention.
Figure 8A:
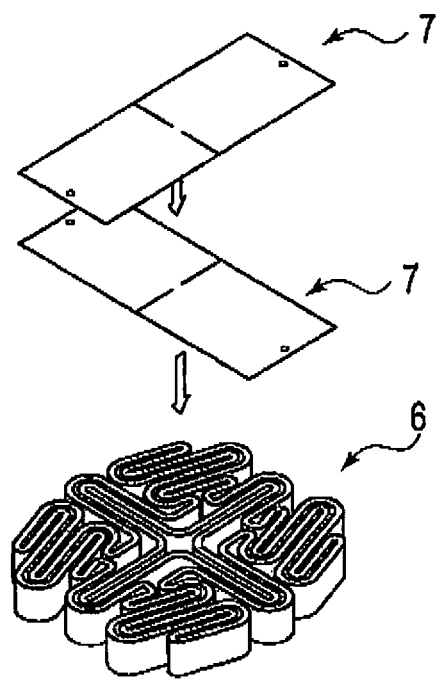
FIG. 8A is a schematic perspective view illustrating the folded airbag covered by placing two cover cloths shown in FIG. 7 thereon like a cross.
Figure 8B:
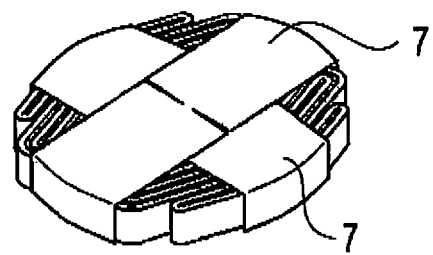
FIG. 8B is a schematic perspective view of the folded airbag held by the two cover cloths.

The cover cloth 7 is not limited to a single cloth. For example, in a fourth embodiment shown in FIGS. 7, 8A, and 8B, the cover cloth 7 may be two rectangular cloths each having slits 11 or cutouts to have cover-cloth piece portions 8. These cover cloths 7 are placed one on the other on the folded airbag 6 like a cross. A detailed description of a way to attach the cover cloths 7 to the folded airbag 6 is also omitted here. However, as means for forming the cover-cloth piece portions 8, one of the cover cloths 7 may have the slits 11 and the other cover cloth 7 may have the cutouts. Which of the cover cloths 7 (one of them having the slits 11 and the other having the cutouts) is to be located above the other, for example, may be selected depending on the situation, or both of the cover cloths 7 may have either the slits 11 or the cutouts. Also in this embodiment, the number of the cover cloths 7 may be changed according to the folded shape of the folded airbag 6. This embodiment can also offer the same effects as the first embodiment.

In the embodiments of the present invention, the present invention is applied to an airbag for the steering wheel (i.e., the driver's seat). However, the present invention can be applied to an airbag for a front passenger's seat if the shape is appropriately changed within the scope of the present invention.

The invention claimed is:

1. An airbag device comprising:
an airbag folded into a shape having a base portion, an upper surface opposite the base portion, and a side portion surrounding a portion between the base portion and the upper surface; and
a holding member configured to cover the airbag as folded by being laid over the airbag as folded,
wherein the holding member has a plurality of cloth piece portions,
wherein the plurality of cloth piece portions are connected only at a single connection portion to one another,
wherein the single connection portion is located at the upper surface of the airbag as folded,
wherein the single connection portion is formed by forming slits in a cloth, and
wherein each of the slits extends radially in a different direction from the single connection portion in a center area of the holding member.

2. The airbag device according to claim 1, wherein the plurality of cloth piece portions equally extend radially from the single connection portion.

3. The airbag device according to claim 1, wherein the holding member is provided in a plurality.

* * * * *